US012755008B2

(12) United States Patent
Steinberg

(10) Patent No.: US 12,755,008 B2
(45) Date of Patent: Oct. 6, 2026

(54) METHODS FOR MANAGING SOFTWARE SUPPLY CHAIN RISK THROUGH DECLARED INTENT

(71) Applicant: CTM Insights, LLC, Yorktown Heights, NY (US)

(72) Inventor: Louis A. Steinberg, Yorktown Heights, NY (US)

( * ) Notice: Subject to any disclaimer, the term of this patent is extended or adjusted under 35 U.S.C. 154(b) by 262 days.

(21) Appl. No.: 18/568,740

(22) PCT Filed: Jul. 27, 2022

(86) PCT No.: PCT/US2022/038523
§ 371 (c)(1),
(2) Date: Dec. 8, 2023

(87) PCT Pub. No.: WO2023/009624
PCT Pub. Date: Feb. 2, 2023

(65) Prior Publication Data

US 2024/0273196 A1 Aug. 15, 2024

Related U.S. Application Data

(60) Provisional application No. 63/226,366, filed on Jul. 28, 2021.

(51) Int. Cl.

| | |
|---|---|
| ***G06F 21/55*** | (2013.01) |
| ***G06F 8/61*** | (2018.01) |
| ***G06F 8/71*** | (2018.01) |

(52) U.S. Cl.
CPC .............. *G06F 21/554* (2013.01); *G06F 8/61* (2013.01); *G06F 8/71* (2013.01); *G06F 2221/033* (2013.01)

(58) Field of Classification Search
CPC . G06F 21/554; G06F 8/61; G06F 8/71; G06F 2221/033; G06F 8/53; G06F 21/566; G06F 8/75
See application file for complete search history.

(56) References Cited

U.S. PATENT DOCUMENTS

| | | | | |
|---|---|---|---|---|
| 8,099,784 | B1 | 1/2012 | Chen | |
| 8,635,694 | B2 | 1/2014 | Malyshev | |
| 10,032,031 | B1 * | 7/2018 | Sharifi Mehr | G06F 21/577 |
| 10,235,519 | B2 | 3/2019 | Guy et al. | |
| 10,333,967 | B2 | 6/2019 | Litva et al. | |
| 10,963,565 | B1 * | 3/2021 | Xu | G06F 21/562 |

(Continued)

OTHER PUBLICATIONS

Korean Intellectual Property Office (KIPO), International Search Report for PCT/US2022/038523, dated Nov. 3, 2022, 4 pages.

(Continued)

*Primary Examiner* — Wei Y Mui
*Assistant Examiner* — Travis Viet Tran
(74) *Attorney, Agent, or Firm* — Douglas J. Ryder; Ryder, Mazzeo & Konieczny LLC

(57) ABSTRACT

Methods and systems are defined for identifying unacceptable actions by a software package from a created list of operational behaviors determined from the software package. The unacceptable actions may result in the automatic alerting on or preventing the execution or deployment of the software package. A method for identifying and mitigating at least one of a resiliency risk and/or a performance issue of a software package is disclosed.

15 Claims, 7 Drawing Sheets

```
{
 "$schema": "http://json-schema.org/draft-07/schema#",
 "$id": "https://behavior.org/schema/sbom-0.5.schema.json",
 "type": "object",
 "title" "Behavior Security Bill of Materials",
 "required": [...],
 "properties": {...},
 "definitions": {
  "coreProject": {
   "type": "object",
   "title": "Component Object",
   "required": [...],
   "properties": {...}
  },
  "component": {
   "type": "object",
   "title": "Component Object",
   "description": "A component of the complete software.",
   "required": [...],
   "properties": {
    "type": {...},
    "name": {...},
    "version": {...},
    "description": {
     "type": [...],
     "title": "Component Description",
     "description": "The description of the component."
    },
    "behaviors": {
     "type": "array",
     "title": "Component Behaviors",
     "description": "The behaviors of the component.",
     "additionalItems": false,
     "items": {
      "$ref": "#/definitions/behavior"
     }
    }
   }
  },
  "behavior": {
   "type": "object",
   "title": "Component Behavior",
   "description": "A behavior related to a component.",
   "required": [...],
   "properties": {
    "id": [...],
    "name": {
     "type": "string",
     "title": "Description",
     "description": "The human-readable name of the behavior."
    },
    "userChoice": {...},
    "detections": {
     "type": "array",
     "title": "Detections",
     "description": "Detected calls to functions, triggering the activation of this behavior.",
     "additionalItems": false,
```

(56) References Cited

U.S. PATENT DOCUMENTS

| | | | | |
|---|---|---|---|---|
| 2012/0317645 | A1 | 12/2012 | Fortier | |
| 2017/0003951 | A1* | 1/2017 | Newell | G06F 9/45558 |
| 2017/0060562 | A1* | 3/2017 | Lopez | G06F 8/60 |
| 2017/0147324 | A1* | 5/2017 | Weber | G06F 8/65 |
| 2017/0251002 | A1* | 8/2017 | Rostamabadi | G06F 21/566 |
| 2018/0039779 | A1 | 2/2018 | Li et al. | |
| 2019/0311130 | A1* | 10/2019 | Hodgman | G06F 21/577 |
| 2020/0218812 | A1 | 7/2020 | Sharifi Mehr | |
| 2023/0305827 | A1* | 9/2023 | Dai | G06F 8/63 |

OTHER PUBLICATIONS

Korean Intellectual Property Office (KIPO), Written Opinion of the International Search Authority for PCT/US2022/038523, dated Nov. 3, 2022, 6 pages.

Korean Intellectual Property Office (KIPO), International Preliminary Report on Patentability for PCT/US2022/038523, dated Nov. 17, 2023, 4 pages.

Canadian Intellectual Property Office (CIPO), Examiners Requisition for Application 3,221,836 (national phase of PCT/US2022/038523), dated Feb. 21, 2025, 8 pages.

European Property Office (EPO), Extended European Search Report for Application 22850247.2 (national phase of PCT/US2022/038523), dated Jun. 12, 2025, 8 pages.

* cited by examiner

| CALL TYPE | ACTION GROUP | | | | | | |
|---|---|---|---|---|---|---|---|
| | Write Data | Write Metadata | Stop/Delete | Manage | Read Data | Read Metadata | Start/Create |
| Process Control | | Set My Process Info | Stop My Processes | | | Get My Process Info | Start My Process |
| File Mgt | Write (or Create) My File | Set My File Attributes | Delete My File | Access or Seek (don't append) My File | Read My File | Read My File Attributes | |
| Device Mgt | Write Device | Set Device Attributes | Release/Detach Device | | Read Device | Get Device Attributes | Attach Device |
| Information Mgt | Set System Information | | | Manage System | Read System Info | | |
| Communication | Local Network Connection Write | Set Local Network Connection Attributes | Close Local Network Connection | | Read Remote Network Connection Attribute | Local Network Connection Read | Create Remote Network Connection |

| | |
|---|---|
| Higher Risk Behaviors | Lower Risk Behaviors |

FIG. 2A

| CALL TYPE | | ACTION GROUP | | | | | | |
|---|---|---|---|---|---|---|---|---|
| | | Write Data | Write Metadata | Stop/Delete | Manage | Read Data | Read Metadata | Start/Create |
| | Process Control | | Set Other's Process Info | Stop Other's Processes | | | Get Other Process Info | Stop Other Process |
| | File Mgt | Write (or Create) Other's File | Set Other's File Attributes | Delete Other's File | Access or Seek (don't append) Other's File | Read Other's File | Read Other's File Attributes | |
| | Device Mgt | | | | | | | |
| | Information Mgt | | | | | | | |
| | Communication | Remote Network Connection Write | | | | Remote Network Connection Read | Read Remote Network Connection Attribute | Create Remote Network Connection |

| Higher Risk Behaviors | Lower Risk Behaviors |
|---|---|

FIG. 2B

| # ID | System Call | Important? | System Call Type | System Call Action Group 1 | Parameters of Interest %rdi | Parameters of Interest %rsi | Parameters of Interest %rdx |
|---|---|---|---|---|---|---|---|
| 435 | clone3 | 5 | Process Control | Set Other Process Info | | | |
| 42 | connect | 10 | Communication | Create Remote Network Connection | struct sockaddr *uservaddr | | |
| 174 | create_ module | 10 | Process Control | Set System Info | char *name | | |
| 176 | delete_ module | 10 | Process Control | Set System Info | char *name | | |
| | execv | -10 | Process Control | | | | |
| 59 | execve | 10 | File Mgt | Access or Seek (don't append) Other Group's File | char *filename | | |
| 322 | execveat | 10 | File Mgt | Access or Seek (don't append) Other Group's File | | char *filename | |
| 269 | faccessat | 5 | File Mgt | Get Other Group's File Attributes | int dfd | char *filename | |
| 439 | faccessat2 | 5 | File Mgt | Get Other Group's File Attributes | int dfd | char *filename | |
| 285 | fallocate | 5 | File Mgt | Delete Other Group's File | long fd | int mode | |
| 91 | fchmod | 10 | File Mgt | Set Other Group's File Attributes | unsigned int FD | | |
| 268 | fchmodat | 10 | File Mgt | Set Other Group's File Attributes | unsigned int DFD | char *filename | |
| 93 | fchmod | 10 | File Mgt | Set Other Group's File Attributes | unsigned int FD | | |

FIG. 3

#2 Behaviors Dashboard

| | | | | | |
|---|---|---|---|---|---|
| File MGT – Not Owned and Not Public | | | | | |
| None | READ METADATA | READ DATA | WRITE METADATA | WRITE DATA | DELETE FILE |
| | ☑ 53 | ☑ 87 | ☑ 393 | ☑ 118 | ☑ 8 |
| Process Control – Not Owned by App | | | | | |
| None | | SET PROCESS INFO | | STOP PROCESS | |
| | | | | ☑ 3 | |
| Device Mgt | | | | | |
| None | ATTACH DEVICE | WRITE DEVICE | SET DEVICE ATTRIBUTES | | DETACH DEVICE |
| | | | | | |
| Information Mgt | | | | | |
| None | | SET SYSTEM INFO | | MANAGE SYSTEM | |
| | | | | | |
| COMMUNICATION - REMOTE | | | | | |
| None | CREATE CONNECTION | READ CONNECTION ATTRIBUTES | READ CONNECTION DATA | WRITE CONNECTION DATA | |
| | ☑ 107 | ☑ 28 | ☑ 87 | ☑ 18 | |

FIG. 4

Behavior: 1000105

Behavior Name: FileWriteMeta

| Component | | | | | |
|---|---|---|---|---|---|
| | | | | | |
| | ID | Call Place Function | Call Place Source File | Called Function | Variables |
| | | | | | |
| Component Name: spring-boot-boot-loader | | | | | |
| | | | | | Variabe: .Name <this> |
| | 0 | getPermission | JarFile.java | java.io.FilePermission.<init> | Variabe: .Name: path |
| | | | | | Variabe: .Name: actions |
| | | | | | |
| Component Name: tomcat-embed-core 9.0.41 | | | | | |
| | | | | | Variabe: .Name <this> |
| | 9 | addPermission | WebappClassLoaderBase.ja… | java.io.FilePermission.<init> | Variabe: .Name: path |
| | | | | | Variabe: .Name: actions |
| | | | | | |
| | | | | | Variabe: .Name <this> |
| | 9 | addPermission | WebappClassLoaderBase.ja… | java.io.FilePermission.<init> | Variabe: .Name: path |
| | | | | | Variabe: .Name: actions |
| | | | | | |
| | | | | | Variabe: .Name <this> |
| | 9 | addPermission | WebappClassLoaderBase.ja… | java.io.FilePermission.<init> | Variabe: .Name: path |
| | | | | | Variabe: .Name: actions |
| | | | | | |
| | | | | | Variabe: .Name <this> |
| | 9 | setPermission | WebappLoader.java | java.io.FilePermission.<init> | Variabe: .Name: path |
| | | | | | Variabe: .Name: actions |

FIG. 5

```
{
 "$schema": "http://json-schema.org/draft-07/schema#",
 "$id": "https://behavior.org/schema/sbom-0.5.schema.json",
 "type": "object",
 "title": "Behavior Security Bill of Materials",
 "required": [...],
 "properties": {...},
 "definitions": {
  "coreProject": {
   "type": "object",
   "title": "Component Object",
   "required": [...],
   "properties": {...}
  },
  "component": {
   "type": "object",
   "title": "Component Object",
   "description": "A component of the complete software.",
   "required": [...],
   "properties": {
    "type": {...},
    "name": {...},
    "version": {...},
    "description": {
     "type": [...],
     "title": "Component Description",
     "description": "The description of the component."
    },
    "behaviors": {
     "type": "array",
     "title": "Component Behaviors",
     "description": "The behaviors of the component.",
     "additionalItems": false,
     "items": {
      "$ref": "#/definitions/behavior"
     }
    }
   }
  },
  "behavior": {
   "type": "object",
   "title": "Component Behavior",
   "description": "A behavior related to a component.",
   "required": [...],
   "properties": {
    "id": {...},
    "name": {
     "type": "string",
     "title": "Description",
     "description": "The human-readable name of the behavior."
    },
    "userChoice": {...},
    "detections": {
     "type": "array",
     "title": "Detections",
     "description": "Detected calls to functions, triggering the activation of this behavior.",
     "additionalItems": false,
```

FIG. 6

METHODS FOR MANAGING SOFTWARE SUPPLY CHAIN RISK THROUGH DECLARED INTENT

BACKGROUND

The frequency and impact of cyber-attacks have continued to increase as online data and accounts have grown in value. One fast-growing technique is for an attacker to embed malware into trusted software, allowing it to be installed without the knowledge of the software's developer (hereinafter "developer") or the software's user (hereinafter, "user"). This embedded malware can be introduced directly into the software created by a trusted developer or can be introduced into externally licensed or provided libraries, modules, and other software components, including service calls to local or network-based application program interfaces (APIs), (collectively "components") that are used by that developer. Even source code management tools and repositories, compilers, and packaging system tools can be compromised to embed malware in the software they produce. The end result is the same: a software application or update including components (collectively a "package" or "software package") is directly or indirectly changed without the knowledge and consent of the trusted developer or the user. This "changed software" is distributed, installed, and utilized by unsuspecting users.

Many third-party risk mitigation efforts, including risk from trusted developers, focus on assessing the third-party's policies, procedures and practices to determine whether they meet minimum expectations. On occasion, source code may be inspected, but several issues serve to minimize the value of this approach including obfuscation of embedded malware, embedded malware in components provided in "binary" (non-source code) form such as libraries, and intellectual property concerns of source code owners. Additionally, assessments provide only a point-in-time perspective of risk, which can change dramatically between assessments (for example, when updates to software occur monthly or quarterly and assessments are performed annually).

Some users and developers attempt to further mitigate risk by analyzing the finished software package. This can be done through "static analysis" scans of the source code and/or binaries (or reverse compiled source code created from the binaries), or through "dynamic analysis" behavioral monitoring of the code at runtime. Both static and dynamic analyses have significant limitations in that they require a "baseline" to compare an analysis against. New versions or derivatives of malware or obfuscated malware (for example source code that has encrypted strings which are decrypted as it runs) are easily missed by static analysis. Dynamic analysis generally compares current runtime behavior against past behaviors, but new releases of software intentionally introduce new functionality and behaviors, so changes from the baseline are expected. The lack of clear, current, and accurate comparison baselines limits the value of static and dynamic analysis in detecting embedded malware. The lack of visibility into the behaviors of third-party provided components additionally serves to frustrate software developers, who are unable to assert that they understand the full behavior of the software packages they distribute.

Given this, demonstrated by recent widescale "software supply chain" attacks that have embedded malware both directly and indirectly into trusted software, it's clear that new approaches are required to detect and prevent such attacks.

SUMMARY OF INVENTION

The current application introduces a new approach to solve this growing problem. One part of the solution enables developers to have visibility into riskiness of different "behaviors", a specific thing done to a specific resource, (sometimes referred to as "activities") performed by previously opaque components, particularly when those components are sourced externally. It also creates a way for developers to pre-declare intended behaviors (called "Declared Intent") that users may find risky, allowing those users an opportunity to inspect the declared behaviors prior to installation or update of software on a data center computer, or desktop computer, or laptop computer (collectively referred to as "computer system"). Each component or subcomponent of software, such as a library, may include a set of declarations describing the expected behavior of that item, and the developer of a software package can review and question the declared but unexpected behaviors of third-party components. All component and subcomponent declarations can be aggregated and added to the declarations of the software package by a developer who then adds their own functions (and declarations). In this way, the final software package delivered by a developer can include a pre-declared set of all expected, intended behaviors of the complete software package, for review: This review provides insights previously unavailable to a developer and provides the user the ability to prevent questionable software from being installed, deployed, or executed thereby reducing expensive mediation activities for the software ecosystem.

Declarations can be stored in a format that is well understood and inspectable by a developer, user, or program. According to one implementation, a format commonly referred to as a Software Bill of Materials ("SBOM") can be extended to include the compiled/assembled list of all declared behaviors. SBOMs typically are used to describe the existence and versions of embedded components, but not what those components are expected to do. Adding behaviors to an SBOM effectively creates a Software Bill of Activities ("SBOA").

One related part of the novel solution defined in this application limits risky runtime behaviors to those that have been pre-declared. This "behavior whitelisting" approach ensures that if malware exists in a software package but whose behavior hasn't been pre-declared, it will be detected and either blocked or generate an alert. Detection and enforcement can be done through the use of containers, virtual machines, and/or operating system filters, such as Linux system calls detected by extended Berkeley Packet Filters ("eBPFs"). Behavior declarations and detection can be further refined by inspecting the parameters used by, for example, functions, methods, services, and system calls.

The combination of user inspectable, pre-declared intentions with runtime enforcement of risky behaviors limited to those which have been pre-declared, forms a complete system of protection to guard against the introduction and obfuscation of embedded malware. This system, novel in data center and desktop environments, is partly analogous to a mobile application requesting access to a resource like the camera, and then preventing access if permission hasn't been granted. One difference is that mobile applications focus on access to resources. The current system is not limited to just the resources accessed, but also considers the requested behaviors of instances of those resources, such as reading a file not created by the software package, controlling processes not owned by the software package, or sending data over a network to a destination outside of a local environment. In contrast, a mobile app might ask for access to a resource, like the camera, but not specify the usage such as taking a still photo, flashing the strobe, or taking a video, and might not distinguish between instances of cameras on a multi-camera device.

Other benefits of such a system include the ability to predeclare dependencies and resources required by a software package, enabling the identification and mitigation of performance or resiliency risk (once a critical dependency is identified, a real-time backup resource can be made available to ensure availability).

According to one implementation, a method, executed by a system having at least one computer, for creating a list of operational behaviors for a software package is described. The method includes scanning the software package to create a list of operational behaviors identified in the software package, wherein the software package includes at least one of (i) developed software and (ii) a software component. The method further includes identifying unacceptable actions by the software package from the list of operational behaviors and determining if at least one of a revision of (i) the software package and (ii) a configuration of the software package is required to alter operational behaviors of the software package.

According to another implementation, a method for at least one of (i) automatic alerting on and (ii) preventing execution or deployment of a software package is defined. The method includes receiving the software package, wherein the software package is comprised of at least one of (i) developed software and (ii) a software component. The method further includes installing the software package onto a computer system, receiving a list of operational behaviors previously determined from the software package and determining, at runtime, if the software package is operating in a manner inconsistent with the list of operational behaviors. The method further includes automatically, in response to determining that the software package is operating in a manner inconsistent with the list of operational behaviors, performing at least one of (i) alerting a user and (ii) altering the execution of the software package.

According to yet another implementation, a method, executed by a system comprised of at least one computer, for identifying and mitigating at least one of (i) a resiliency risk and (ii) a performance issue of a software package is disclosed. The method includes assessing the software package to create a list of operational behaviors identified in the software package, wherein the list of operational behaviors establishes a list of required system dependencies and resources, wherein the software package is comprised of at least one of (i) developed software and (ii) a software component, and wherein the step of assessing includes at least one of (i) scanning or (ii) manually reviewing the software package. The method further includes indicating the list of system dependencies and resources on at least one of (i) a display device or (ii) adding the list to a repository and determining at least one of (i) securing additional system dependencies or resources for proper execution of the software package and (ii) revising the software package to alter the operational behavior of the software package.

BRIEF DESCRIPTION OF THE DRAWINGS

The above and other aspects, features, and advantages of the present disclosure will become more apparent in light of the following detailed description when taken in conjunction with the accompanying drawings to which the principles of the present disclosure are applicable:

FIGS. 2A and 2B illustrate tables of representative sample behaviors for a software package, according to one embodiment.

FIG. 3 illustrates an example of a mapping of representative low-level system calls to some of the behaviors in FIGS. 2A and 2B, according to one embodiment.

FIG. 4 illustrates and example of a high-level dashboard of risky behaviors in a software package for a developer to review, according to one embodiment.

FIG. 5 illustrates an example drill-down for one specific behavior from FIG. 4, according to one embodiment.

FIG. 6 illustrates a portion of an SBOM extension, which includes behavior declarations, according to one embodiment.

DETAILED DESCRIPTION

Figure 1:
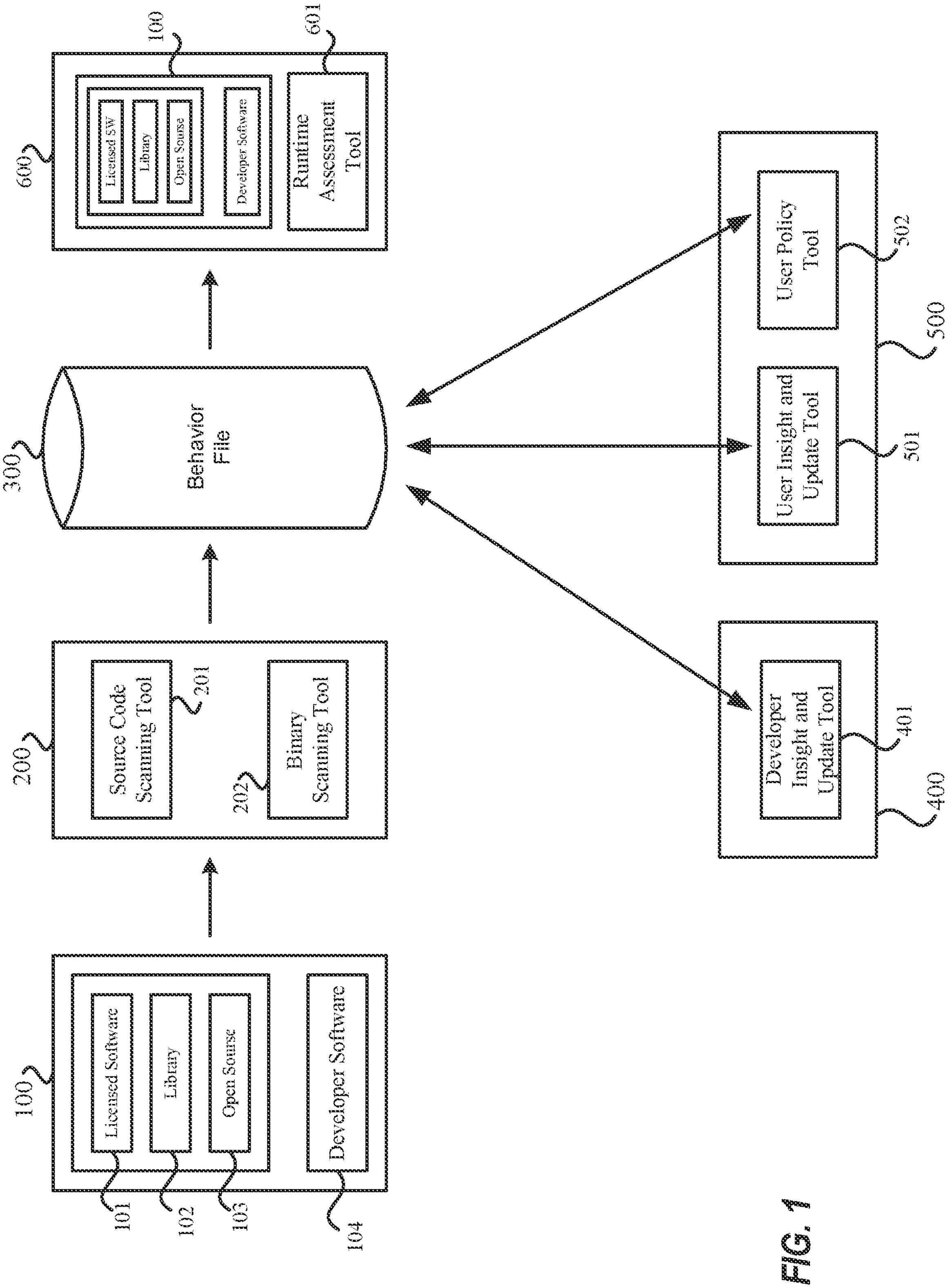
FIG. 1 illustrates a block diagram of an example system that defines an environment for executing novel methods to achieve the main functions thereof, according to one embodiment.

It should be understood that the elements shown in the figures may be implemented in various forms of hardware, software or combinations on one or more appropriately programmed general-purpose devices, which may include a processor, memory and input/output interfaces. Those skilled in the art will be able to devise various arrangements which, although not explicitly described or shown herein, embody the principles of the disclosure and are included within its scope.

All examples recited herein are intended to aid the reader in understanding the principles of the disclosure and the concepts and are to be construed as being without limitation to such specifically recited examples and conditions. Any flow charts, flow diagrams, state transition diagrams, pseudocode, and the like represent various processes which may be substantially represented in computer readable media and so executed by a computer or processor, whether or not such computer or processor is explicitly shown.

A system is defined that mitigates the risk of malware being embedded in trusted software, whether directly in the source code or introduced through third-party libraries and similar functions. This system has three main functions: (i) detecting and illuminating to a developer, behaviors considered risky within a software package, (ii) storing the behavior declarations, and loading pre-declared risky behaviors of a software package for a user or policy tool to review prior to installing or executing the software package, and (iii) detecting and responding to run-time violations (risky behaviors that were not declared). The three main functions will be described in more detail below.

FIG. 1 illustrates a block diagram of an example system that defines an environment for executing novel methods to achieve the main functions noted above. The main components of the system are a software package 100, at least one (i) static scan tool 200, (ii) a behavior file 300, (iii) a developer environment 400, (iv) a user environment 500 and (vi) a computer or a computer system 600 running the software package 100. The software package 100 may include developer software 104 and when needed, one or more software components including licensed software 101, a software library 102 and open-source software 103. The static scan tool 200 includes at least one of (i) a source code scanning tool 201 and (ii) a binary scanning tool 202. The static scan tool 200 may be loaded on and operated by a general-purpose computer as is well known to one skilled in the art (not separately illustrated or identified). The software package 100 may be assessed by the static scan tool 200. The output of the static scan tool 200 is a list of operational behaviors. The list of operational behaviors is stored in the behavior file 300. The behavioral file 300 may be stored in a storage medium, database, or the like.

The developer environment 400 may include a general-purpose computer or server (not separately illustrated or identified) and a display device (not separately illustrated or identified). The developer environment 400 is utilized by the developer before the software package 100 is released. The developer environment 400 may also be utilized before the developer releases updates or modifications to the software package 100. The developer environment 400 includes a developer insight and update tool 401 which is loaded on and operated by the computer/server. The developer insight and update tool 401 receives the list of operational behaviors from the behavior file 300. The developer insight and update tool 401 is utilized to determine if the software package 100 demonstrates unexpected or unacceptable behaviors that require modification or update, and may also be used to correct, update, or enhance the behavior file 300 based on the developer's understanding of expected configuration and behavior of the software package 100. The developer may utilize the display to present the list of operational behaviors, determine and identify the unexpected or unacceptable behaviors, and determine and identify modifications or updates required to the software package 100 or the behavior file 300.

The user environment 500 may include a general-purpose computer or server (not separately illustrated or identified) and a display device (not separately illustrated or identified). The user environment 500 is typically utilized by an operator of a computer system to determine if the software package 100 is safe to be installed on the computer/server. The user environment 500 may include a user insight and update tool 501 and a user policy tool 502 which are loaded on and operated by the computer/server. The user insight and update tool 501 and the user policy tool 502 each receive the list of operational behaviors from the behavior file 300. The user insight and update tool 501 is used to determine if the software package 100 demonstrates unexpected or unacceptable behaviors that the operator finds unacceptable. The user policy tool 502 compares the list of operational behaviors for the software package 100 to defined policies related to behaviors to determine if any of the behaviors for the software package 100 are outside the scope thereof. If an unexpected, unacceptable or outside the scope behaviors are identified, the operator will either advise the software developer of a needed revision or will take steps to restrict or modify the use of software package 100. Additionally, both the user insight and update tool 501 and the user policy tool 502 may update the behavior file 300 to further define, refine, or restrict the expected operational behaviors based on the user's understanding of the configuration and implementation specifics of the software package 100 when installed on the computer system 600. The operator may utilize the display to present the list of operational behaviors, determine and identify the unexpected or unacceptable behaviors, determine outside the scope behaviors, identify these behaviors for the developer, and identify restrictions or modifications for use of the software.

The computer system 600 has the software package 100 loaded and running thereon. The computer system 600 utilizes a runtime assessment tool 601 to load the behavior file 300 and determine if software package 100 is operating in a manner inconsistent with the list of operational behaviors received from behavior file 300. If it is determined that the software package 100 is operating in an inconsistent manner, the computer system 600 will either (i) alert a user or (ii) alter the execution of the software package 100.

Software package 100 may perform many functions. The risks associated with the functions being performed depend on the specific behaviors (also called "activities") taken and the attributes of the resources they act upon. Activities performed by (or behaviors of) a software package 100 that may be classified risky include, but are not limited to, writing to remote network locations (which could be used, for example, to exfiltrate data), stopping processes not owned by this program (which could be used, for example, to interfere with antivirus programs), and writing to files not created by this program (which could be used, for example, by ransomware to encrypt files).

FIGS. 2A and 2B illustrate tables of representative sample behaviors for a software package 100. FIG. 2A illustrates representative sample behaviors for local/owned resources used by the software package 100 and FIG. 2B illustrates sample behaviors for remote/not owned resources used by the software package 100. For example, the File Mgt Call Type row in FIG. 2A illustrates representative behaviors with respect to files or directories owned by the software package 100 and the corresponding row in FIG. 2B illustrates representative behaviors with respect to files or directories not owned by the software package 100. As illustrated, the behaviors are divided by call types, such as, process control, file management, device management, information management, and communications. The types of behaviors performed by the software may be consolidated into Action Groups that span different resource classes (referred to as "call types"). For example, an Action Group of writing data could be applied to a specific network or file resource, each of which is accessed through a call type. Each call type may have one or more Action Groups associated therewith. The specific behaviors associated with a call type and an Action Group may have varying degrees of cybersecurity risk. The higher risk behaviors and lower risk behaviors are identified in the figures. As can clearly be seen in the FIGS. 2A and 2B, there are higher risk behaviors in FIG. 2B associated with the software package 100 that does not own the item being accessed or operated on. For example, some of the various behaviors associated with the file management call type are considered high risk when the file/directory is not owned by the software while they are considered lower risk when the file/directory is owned by the software. Conversely, creating files or seeking within an open file may be considered lower risk behaviors. In another example, this one looking at an Action Group of Writing Metadata with a call type that does Process Control, we see in FIG. 2A that the risk of writing information that updates attributes of a process owned by the software package 100 is considered low. In FIG. 2B, the risk of that same behavior on a process not owned by the software package 100 is considered high.

It may generally be up to the implementation to define the risk tolerance associated with different Actions or Action Groups for each type of behavior. These Actions are performed on variables that further refine the risk level, which in the file management example might represent the actual file name or path, as reading some files might be considered high-risk and others low-risk. In some embodiments, variables can be grouped based on attributes such as whether the software package 100 is the "owner" of the file or directory being acted on, the file or directory permissions, or a portion of the file's directory "path". In some embodiments, concepts like Linux "namespaces" may be used to represent a group of variables. Continuing with the file management example, an Action might be reading a file, and a namespace variable might indicate files not world readable and not owned by this process. A software package 100 that reads such a file might be thought of as having an elevated security risk. Behaviors with elevated risk should be declared.

Details and a description of the three main function of the system follow.

(i) Detecting and Illuminating Risky Behaviors

Risky behaviors can be identified manually by reviewing source code, and also by scanning source code using the source code scanning tool 201 or binary scanning tool 202 and looking for indications of behaviors that may be risky.

Software packages 100 can pre-declare their expected risky behaviors, for example those behaviors identified as risky in FIGS. 2A and 2B. Source code, written in a "high-level" language such as C, C++, Python, or Java, can be automatically scanned using the source code scanning tool 201 to detect its behaviors and potentially "variables" defined below: This scanning can be done using a rules-based or a Machine Learning (Artificial Intelligence) based scanner. Scanning code is often referred to as "static analysis" and is often used to search for malware signatures (though it can also be used to detect vulnerabilities, logic errors, license information, etc.)

Often, there will be specific details, called "variables", that describe what is being acted upon. For example, FIG. 5 shows the result of a scan that may be displayed by the developer insight and update tool 401 that provides insight into the variables. The behavior in this example might be writing Metadata for a file not owned by the software package and a variable could be all or a portion of the file name or path. In some instances, variables will be embedded in the source code while in other instances they will be specified in external configuration files or network destinations. When variables are externally defined, a placeholder can be created and used to later query the user of a software package 100 about their configuration and implementation. The responses again form the basis of a set of expected behaviors (which can include both behaviors and variables).

As previously noted, the software package 100 may include more than simply source code. The other portions of the software program may be scanned as well to determine additional behaviors. According to one embodiment, the binary scanning tool 202 may be used to scan and review the assembly language code and symbol tables of (i) binary executable packages and/or (ii) software components used by software packages. In one example implementation, the scans will look for "system calls" or similar requests to the operating system to perform behaviors on behalf of the software package or component. Scanning assembly language from compiled binary executables is particularly helpful when a component, such as a third-party library, is only available in binary form. It can also be helpful to minimize the number of languages the scanning tools must be able to understand, as all "high-level" compiled languages such as C, C++, compiled Java, etc. result in assembly code being generated.

In some embodiments which scan software, it may be desirable to first reverse the order of the software operations prior to scanning. This can provide efficiencies as a file containing the instructions can then be read from the end to the beginning. For example, behaviors may be detected by inspecting system calls in an Intel x86 or x64 architecture. To understand the behavior, one must look at the values populated in registers prior to the "syscall" operation or interrupt. Rather than tracking all register values continuously, reversing the order of assembly language instructions allows scanning software to simply look for an instance of the system call and then continue scanning forward until the register values of interest are populated. These are the values that in non-reversed order were populated prior to the system call. One skilled in the art will clearly be able to see how this also applies to other languages, including high-level source code.

In some embodiments, functions, methods, and subroutines (collectively "functions") in libraries or other components may be called from software being scanned. In many embodiments, these libraries or other components may be dynamically linked. Whether statically or dynamically linked, any software component not included with a software package may still be scanned. In many embodiments, only the functions invoked (and functions further invoked from them) need be scanned instead of scanning and including the behaviors of unused functions in components.

The use of automated scanning and classification removes variation caused by human judgement regarding how a particular behavior should be classified and the level of associated risk. The output also allows for human inspection, which has several benefits. One such benefit is that such output provides behavior visibility to a developer who may be using third-party packages or components. In this example, a developer may learn of unanticipated behaviors in the software he or she is including or invoking, directly or indirectly, within their software package.

FIG. 4 illustrates an example of a high-level dashboard of risky behaviors in a software package 100 for a developer to review. The dashboard may be generated by using the developer insight and update tool 401. The dashboard shows the various behaviors for the software package 100 as well as an identification of the associated call types, and Action Groups. The dashboard may also identify the risk associated therewith or a count of the number of behaviors detected. FIG. 5 illustrates an example drill-down for one specific behavior from FIG. 4 indicating the components that "write metadata".

According to one embodiment, a developer may observe that the detected behavior is incorrect or incomplete. This can happen, for example, when a variable is needed to fully classify a behavior but that variable isn't embedded in the software package. In this case, the developer may update or correct the results of the automated classification Many languages, both high-level and assembly, often require understanding the context of a sequence of steps to determine behavior. For example, a function or system call to "read( )" or "write( )" often refers to an open data structure called a "file descriptor". An earlier function or system call creates the file descriptor, and could contain the location of the file (which, as previously described, is a "variable" that can affect the degree of risk). In many operating systems and languages, file descriptors also represent network connections or endpoints, so a "read( )" or "write( )" call could be of call type file management or communication. Understanding the variables and specific call used to create the file descriptor is clearly relevant when that file descriptor is later used.

In some embodiments, a pre-existing list of risky behaviors (call types, actions, and variables or groups of variables) will be created along with a risk score of each behavior listed. FIG. 3 illustrates an example mapping of representative low-level system calls to some of the behaviors in FIGS. 2A and 2B. The mapping includes an example of some Linux system calls, with registers holding potentially relevant variables, and risk scores, that are mapped to the call type and action group classifications shown in FIGS. 2A and 2B. When a system call is observed in assembly language, and potentially associated with relevant prior system calls, it can be thresholded using the "Important?" risk score (third column) in FIG. 3 and if above a threshold the appropriate system call type and Action (or Action Group) in FIG. 2A or FIG. 2B is found. As previously described, FIGS. 2A and 2B can be used to test whether the behavior is one that should be summarized and declared for the component or software package. Behavior declarations can be independently captured for various third-party components and subcomponents, including but not limited to by suppliers of third-party libraries, open source software, and other software module authors. These declarations can then be combined and added to any declarations created by a software package developer to create a full (or compiled) set of declarations (a "behavior file" 300) of risky behaviors for the full software package.

In some embodiments, the act of scanning software components or packages will be integrated with a CI/CD ("Continuous Integration/Continuous Deployment" or "Continuous Integration/Continuous Delivery") system. In others, it will be integrated with a source code repository or build system. In still others, it will be integrated with a developer's IDE (Integrated Development Environment"). In any case, the intent in these embodiments is to help automate the process of creating behavior files 300 or repositories as code is developed, checked in, built, or delivered.

In some embodiments, this approach to capturing declarations will be extended beyond cyber security risk. For example, a set of resource dependencies that a software package requires to function correctly can be aggregated from all components. These dependencies might include access to files, compute resources, RESTful and other network services, etc. This is of great value to those who seek to understand dependencies when building resilient systems.

(ii) Behavior Declaration Storage and User Review

As described above, engineers, security professionals, and others (collectively "users") who wish to assess the risk and other characteristics such as dependencies of a software package 100 can inspect the declarations prior to deploying or running said software package 100. In one embodiment, the declarations created by scanning the software package 100 can be inspected using a computer system by directly comparing the declarations to a set of established policy constraints or accepted runtime behaviors. Questions regarding behavior can be resolved and compensating controls designed, risks accepted, or a decision can be made to not deploy.

This is best achieved when declarations are in an accessible place and in a well understood format. In some embodiments, the behavior file 300 for each version of each software package 100 can be published to a well-known place. Examples of this include but are not limited to posting them on the web site of a software or component provider, placing them in a public repository, or placing them on a blockchain. In other embodiments, the behavior declarations can be supplied with the software package, either embedded in the software or as a companion file.

While many formats can be used to communicate declared behaviors, there is particular value in using a consistent format (or "schema") and taxonomy that is both readily understandable by users and can be ingested and parsed by other software tools. In one embodiment, a Software Bill of Materials ("SBOM") can be extended to include behavior declarations. FIG. 6 illustrates an example of an SBOM extension which includes behavior declarations. Traditional SBOMs list the components embedded in a software package along with details such as the version and license information of each component. Extending an industry standard or commonly used SBOM's (such as SWID®, SPDX®, CycloneDX, etc.) schema and taxonomy creates what can be thought of as a Software Bill of Activity ("SBOA") to describe the expected behaviors of a software package in a readily distributable and understandable form. FIG. 5 shows an example schema extension for CycloneDX which includes an array of detected behaviors and their attributes, encoded in a "JSON" (JavaScript Object Notation). It should be obvious that any mechanism meant to store an SBOM can also be used to store a behavior file 300 that is formatted as an SBOM or SBOM extension. In some cases, the variables associated with a software component or package are not known until the software is deployed and configured. For example, the path to a log file may be dependent on how logging is configured on a given system. In another example, the network IP addresses for communicating information that are considered external to a user's environment may be unique to that environment. For this reason, there will be times when variables and logical groups of variables must be defined by the user and added to the behavior file 300 after the declarations from the developer are received. In some embodiments, a tool will be used that scans behavior files 300 for behaviors with incomplete variables and queries the user regarding the values expected. Continuing with the network communications example, a detected network-based write to an address that has been obfuscated or defined in an external configuration of the software package (vs. clearly embedding the destination in the software) might result in a user being asked to list the addresses or subnets to which the software package is expected to send information. The response to this question could be added to the behavior file 300.

In yet another example of valuable human inspection, the results of scan and classification, whether corrected or not, can be made available to the user of a software package. In this example, the user has an opportunity to understand some or all of the potentially risky behaviors of the software package 100 and decide whether to accept them before installing or using the software package 100.

(iii) Declaration Violations: Detection and Response

Attackers who attempt to insert ("inject") malicious software into a component or software package 100 often take steps to obfuscate or hide its existence. For this reason, static scans and declarations of expected behavior may be insufficient. One novel element of this complete system is that it also observes the run-time behavior (called a "dynamic scan") of a software package 100 and detects undeclared behaviors that were unanticipated by the software package 100 developer or component provider ("behavioral deviations"). When a behavioral deviation is detected, the system may seek to block the undeclared behavior and/or alert a user.

For example, should the behavior file 300 for a software package 100 not include a declaration that the software package 100 intends to communicate with servers outside of a specific country or geography, any attempt to do so would be a behavioral deviation. Similarly, undeclared attempts to manage a system or processes not owned by a software package 100 would constitute behavioral deviations. These examples are representative for clarity and not intended to be encompassing or limit the concept in any way.

In some embodiments, behavior detection might make use of "system call filters" or other operating system kernel level capabilities, including but not limited to Linux Namespaces. In other embodiments, run-time containers such as Docker or container orchestration systems such as Kubernetes can be used to detect behaviors and compare them with an ingested behavior file 300. In still other embodiments, application, container, or external network firewalls might be used. Those skilled in the art will readily see a number of places where detection of behavioral deviation could be implemented.

Expected behavior of a software package 100 or component may change based on external factors, including but not limited to day or date, the state of other applications and services, the state of hardware devices, or thresholded values of external metrics. For example, a software package 100 might be expected to run a report once a quarter, and send that report to a foreign destination. At other times, no communication is expected. In another example, monitoring software might be expected to only communicate within a network of devices being monitored, unless one of the devices fails and requires an external alert to be sent. In yet another example, the behavior of a stock market trading application might be expected to change on days of extreme market volatility, or if the price of a specific stock rose or fell. In some embodiments, a conditional anticipated behavior may be declared by the developer. In some embodiments these conditions may be detected by scanning the software package 100 or component, while in other embodiments they may be added or updated by the developer or provider of the software or component. In some embodiments, a user might further define or refine the external factors and conditional anticipated behaviors.

Users may have their own policies that define expected, permitted, or disallowed behaviors that may be utilized by a person or a user policy tool 502. These may be used to further customize both behavioral deviations and when to take an action, such as alerting or blocking a behavior. In some embodiments, they may be stored within a user policy tool 502. In some embodiments a user might add, remove, or modify the expected behavior declarations, including behavior conditions based on external factors, manually or using an automated tool. In some embodiments, a user may manually or through an automated tool, further change the action to take when a behavioral deviation is protected.

As will be obvious to one skilled in the art, detection of behavior deviation from expectations has value outside of detecting injected malware. For example, it can illuminate dependencies that were otherwise unseen, allowing design changes that enable resiliency and performance improvements of runtime software. One design change for this example might be to add redundancy or additional capacity to critical systems and services that the software package 100 depends upon for proper execution.

SUMMARY OF DESCRIBED SYSTEM

As has been shown, there is a need for both developers and users to better understand the expected behaviors of software packages and components prior to distributing, installing or executing said software. Defined herein are novel methods for detecting and presenting previously opaque, potentially risky behavior to developers and users. These behavior declarations can be inspected and modified as required. Additionally, a novel system leverages these declarations to detect runtime deviations from expected behavior, preventing obfuscated, injected malware from causing harm.

It is to be appreciated that, except where explicitly indicated in the description above, the various features shown and described can be considered cumulative and interchangeable, that is, a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments for methods for creating a list of operational behaviors, using the list of operational behaviors to (i) communicate those behaviors to developers and users, (ii) automatically alert on deviations or alter the execution of a software package 100 or (iii) identify and mitigate a resiliency risk or a performance issue of a software package 100. It is noted that modifications and variations can be made by persons skilled in the art in light of the above teachings. It is therefore to be understood that changes may be made in the particular embodiments of the disclosure which are within the scope of the disclosure as outlined by the appended claims.

The invention claimed is:

1. A method for at least one of (i) automatic alerting on and (ii) preventing execution or deployment of a software package, the method comprising:

scanning, using at least one of (i) a static scanner and (ii) manually scanning, the software package to create a first list of high-risk operational behaviors identified in the software package, wherein the software package includes at least one of (i) developed software and (ii) a third-party software component;

determining if a revision of at least one of (i) the software package and (ii) a configuration of the software package is required to alter at least one of the operational behaviors from the first list of high-risk operational behaviors;

storing a second list of high-risk operational behaviors that is a subset of the first list of high-risk operational behaviors that do not require a revision of at least one of (i) the software package and (ii) a configuration of the software package;

installing the software package onto at least one computer system;

receiving the second list of high-risk operational behaviors;

determining, using a dynamic scanner at runtime, a third list of high-risk operational behaviors of the software package;

creating a fourth list of high-risk operational behaviors as a subset of the third list of high-risk operational behaviors that are not included in the second list of high-risk operational behaviors; and determining, based on the fourth list of high-risk operational behaviors, whether to perform at least one of (i) alerting a user and (ii) altering the execution of the software package.

2. The method of claim 1, wherein the determining if a revision of at least one of (i) the software package and (ii) a configuration of the software package further comprises editing, by a developer of the software package, at least one of (i) the software package and (ii) the configuration of the software package.

3. The method of claim 1, further comprising assessing, by at least one of (i) a user of the software package and (ii)

a policy tool, the second list of high-risk operational behaviors prior to installing or executing the software package.

4. The method of claim 3, further comprising editing, by a user of the software package, the configuration of the software package prior to execution of the software package.

5. The method of claim 1, wherein at least one of (a) the first list of high-risk operational behaviors and (b) the third list of high-risk operational behaviors are is identified from at least one of (i) a specified system call, (ii) software call, (iii) function, (iv) method, (v) macro and (vi) an external service.

6. The method of claim 1, wherein the storing the second list of high-risk operational behaviors includes storing the second list of high-risk operational behaviors in at least one of (i) a software developer's Software Bill of Materials (SBOM), (ii) a locally accessible file, (iii) a centrally maintained database, (iv) a publicly accessible file, (v) a website and (vi) a blockchain.

7. The method of claim 1, further comprising:

comparing, by at least one of (i) a software developer, (ii) a user and (iii) a policy tool, at least one of the (a) first list, (b) second list, (c) third list and (d) fourth list of high-risk operational behaviors against a published policy of operational behaviors.

8. The method of claim 1, wherein the scanning the software package includes first re-writing in reverse order lines of code of at least a portion of the software package.

9. The method of claim 1, wherein the software component includes at least one of (i) a statically-linked software routine, (ii) a statically-linked software library, (iii) a dynamically-linked software routine, (iv) a dynamically-linked software library, (v) an external method, (vi) an external function, and (vii) an external service.

10. The method of claim 1, wherein the scanning to create a first list of high-risk operational behaviors by comprises scanning at least one of (i) source code and (ii) assembly language decompiled from binary executables.

11. The method of claim 5, further comprising inspecting parameters passed into at least one of (i) the specified system call, (ii) the software call, (iii) the function, (iv) the method, (v) the macro and (vi) the external service to classify at least one of (a) the first list of high-risk operational behaviors and (b) the third list of high-risk operational behavior.

12. The method of claim 1, further comprising comparing the third list of high-risk operational behaviors to a set of rules which limit intended behavior based on external attributes, wherein the set of rules includes at least one external factor.

13. A method, executed by a system comprised of at least one computer, for identifying and mitigating at least one of (i) a resiliency risk and (ii) a performance issue of a software package, the method comprising:

scanning the software package to create a first list of resiliency and performance operational behaviors identified in the software package, wherein the first list of resiliency and performance operational behaviors establishes a list of required system dependencies and resources, wherein the software package is comprised of at least one of (i) developed software and (ii) a third-party software component, wherein the scanning includes at least one of (i) scanning using a static scanner and (ii) manually scanning the software package;

indicating the list of required system dependencies and resources on at least one of (i) a display device and (ii) adding the list to a repository;

creating, using a dynamic scanner at runtime, a second list of resiliency and performance operational behaviors of the software package;

identifying a third list of resiliency and performance operational behaviors that are present in second list of resiliency and performance operational behaviors that are not present in the first list of resiliency and performance operational behaviors; and determining, based on the third list of resiliency and performance operational behaviors, whether to perform at least one of (i) securing additional system dependencies or resources for proper execution of the software package, (ii) revising the software package to alter the operational behavior of the software package and (iii) revising a configuration of the software package.

14. The method of claim 13, wherein the third-party software component includes at least one of a (i) statically-linked software routine, (ii) a statically-linked software library, (iii) a dynamically-linked software routine, (iv) a dynamically-linked software library, (v) an external method, (vi) an external function, and (vii) an external service.

15. The method of claim 13, wherein the software package is comprised of at least one of (i) source code and (ii) assembly language decompiled from binary executables.

* * * * *